United States Patent [19]

Rassieur

[11] Patent Number: 4,482,173
[45] Date of Patent: Nov. 13, 1984

[54] DRILL STRING JOINT

[75] Inventor: Charles L. Rassieur, Creve Coeur, Mo.

[73] Assignee: Central Mine Equipment Company, St. Louis, Mo.

[21] Appl. No.: 524,908

[22] Filed: Aug. 22, 1983

[51] Int. Cl.³ .............................................. F16L 25/00
[52] U.S. Cl. ...................................... 285/330; 403/334
[58] Field of Search ...................... 403/334, 358, 361; 285/330, 332

[56] References Cited

U.S. PATENT DOCUMENTS

| Re. 26,938 | 8/1970 | Rassieur | 403/378 X |
| 1,542,266 | 6/1925 | Palmer et al. | 403/334 X |
| 2,463,124 | 3/1949 | Sims | 403/334 |

FOREIGN PATENT DOCUMENTS 1237330 6/1960 France ............................ 403/334

Primary Examiner—Andrew V. Kundrat
Attorney, Agent, or Firm—Polster, Polster and Lucchesi

[57] ABSTRACT

A drill string joint of the type shown and described in Rassieur U.S. Pat. No. Re. 26,938, in which the coupling surfaces are tapered.

1 Claim, 6 Drawing Figures

DRILL STRING JOINT

BACKGROUND OF THE INVENTION

A sliding coupling has the great advantage of simplicity in use over threaded couplings. There are various types of sliding couplings, the one shown in Rassieur U.S. Pat. No. Re. 26,938 being one. Others have three or more keys instead of two, and may not provide an O-ring seal. Still others use a noncircular coupling, e.g., octagonal, which eliminates the need for keys.

In all of these couplings, there is the problem of fine sand's getting into the joint so that the joints will not easily slide apart. It is frequently necessary to beat on the joint to loosen the sand. In the Rassieur joint shown in Re. 26,938, the O-ring seal prevents sand from getting into the joint from outside the auger, but in drilling in sand below the water table, sand can get into the joint from inside the hollow stem auger.

It has been found that by providing a slight taper of the sliding coupling surfaces, the problem of binding of the joints with fine sand can be eliminated.

One of the objects of this invention is to provide a simple drill string joint that can be uncoupled in spite of the presence of fine sand between the coupling surfaces.

Other objects will become apparent to those skilled in the art in the light of the following description and accompanying drawing.

SUMMARY OF THE INVENTION

In accordance with this invention, generally stated, in a hollow-stem auger drill string slip-type joint with a hollow, female outer part connected to one section of drill string and a male, inner part connected to another section of drill string, the female part having an inner wall defining a socket and the male part an outer wall surface defining a coupling member shaped complementarily to the female socket, the wall defining the socket diverges axially outwardly to an open mouth and the wall defining the male coupling converges toward its free end substantially complementarily to the wall defining the socket. In the preferred embodiment, the walls defining the socket and the shape are conical, feather keys and keyways are provided, with facing bottom surfaces that also are complementarily tapered, and the divergence of the socket wall and convergence of the male coupling wall are on the order of 0.5° to 1.5°.

DESCRIPTION OF THE PREFERRED EMBODIMENT

Figures 1, 2:
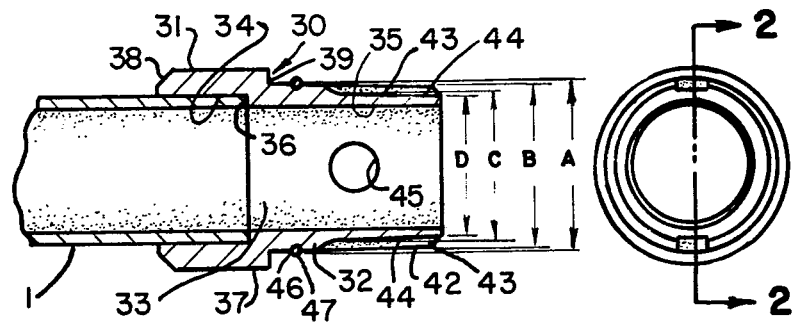
FIG. 1 is a view in bottom plan of a male joint member.
FIG. 2 is a sectional view taken along the line 2—2 of FIG. 1.

Referring now to the drawing for one illustrative embodiment of this invention, reference numeral 1 indicates a section of drill string of a hollow stem auger, which, for illustrative purposes will be considered the lower section, and reference numeral 2 indicates an upper section of drill string. The two sections are connected by a joint assembly 5. The joint assembly is made up of a female member 10 and a male member 30.

Figures 3, 4:
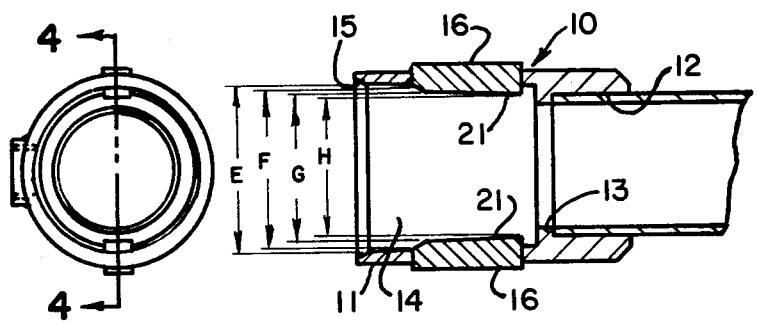
FIG. 3 is a view in top plan of a female joint member.
FIG. 4 is a sectional view taken along the line 4—4 of FIG. 3.
Figures 5, 6:
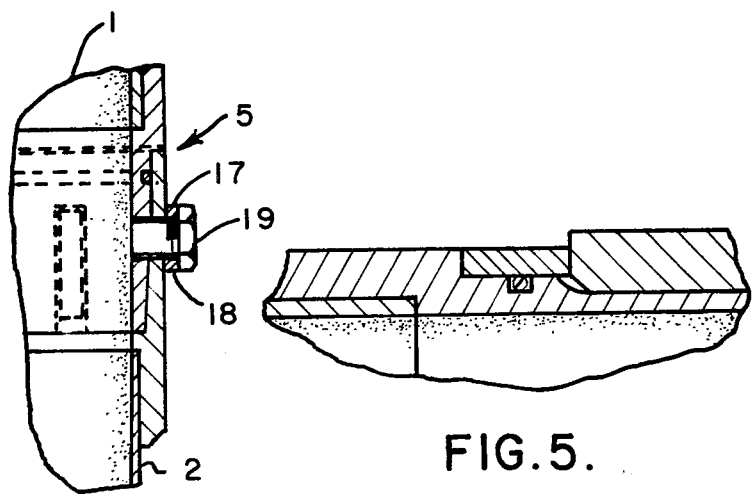
FIG. 5 is a fragmentary view in section, somewhat enlarged, showing a portion of the coupled members viewed in the same aspect as FIGS. 2 and 4.
FIG. 6 is a fragmentary sectional view taken at right angles to the view shown in FIG. 5, inverted with respect to its usual orientation in use.

The female member 10, in this embodiment, has an unstepped cylindrical outer surface and is divided internally into a cylindrical socket 11 and a drill string seat 12 by an annular shoulder 13. The annular shoulder 13 projects radially inwardly with respect to the drill string seat to the thickness of the wall of the drill string section 2, to form a smooth bore with the end of the drill string 2 that is mounted in it, and a greater distance with respect to an inner socket wall 14, which has a greater inside diameter than the inner wall of the seat 12. The inner wall 14 is chamfered at an open mouth 15 of the socket, and is provided with rectangular openings in which two, diametrically oppositely located feather keys 16 are mounted. The feather keys 16, which, in this embodiment, are welded into place, project radially inwardly beyond the socket wall 14, and have an inner surface 21. A bolt aperture 17, best shown in FIGS. 3 and 6, is surrounded on the outer surface of the socket with an internally threaded lock bolt boss 18, to receive a threaded lock bolt 19.

The male member 30 has a seat section 31, within which an end of the drill string section 1 is mounted, and a coupling section 32. The seat section 31 has an inner wall 34 ending in an annular shoulder 36 proportioned to provide with the drill string section 1 and an inner wall surface of the coupling section a smooth continuous bore 33. An outer surface 37 of the drill string section is chamfered at its outer edge 38 and ends in a step 39 to an outer surface 42 of the coupling section, which is of smaller outside diameter than the surface 37. The outer surface 42 is provided with keyways 43, positioned diametrically opposite one another to receive the keys 16 of the female socket. A bolt hole 45 extends through the coupling wall at right angles to the keyways. In this embodiment, the outer surface 42 also has in it an annular O-ring channel 46 in which an O-ring 47 is seated.

All of the elements described are common to the joint assembly of Rassieur Re. 26,938. In the present joint, however, the inner surface 14 of the female socket, and the inner surface 21 of the keys 16 are tapered divergently toward the mouth 15 of the socket. The amount of the taper of the surface 14 is shown by the difference between the distance E and the distance F in FIG. 4, and the taper of the surface 21 of the keys, by the difference between the distances G and H in that same figure. As an example of the amount of taper, the difference between the distances E and F, in a socket 3.5" long can be 0.045", providing 0.73° of taper. The taper of the surfaces 21 of the keys can also be 0.73°.

Similarly, the outer surface 42 of the coupling section 32 is tapered convergently from the shoulder 39 to the outer end of the coupling member an amount which is the difference between the distances A and B as shown in FIG. 2. In this embodiment, the bottom surface 44 of the keyways 43 is similarly tapered, the amount being indicated by the difference between the distances C and D in FIG. 2. Again, the difference between B and A can be 0.045" over a span of 3.5", both the outer surface of the coupling and the bottom surface of the keyways tapering at 0.73° in this illustrative embodiment.

The preferred range of degrees of taper is on the order of 0.5° to 1.5°. A greater amount of taper requires a heavier cross section and therefore adds weight and cost to the coupling, and less taper begins to approach the parallel, which poses the binding problem.

Numerous variations in the construction of the joint of this invention, within the scope of the appended claims, will occur to those skilled in the art in the light of the foregoing disclosure. Merely by way of example, the socket and coupling can be made noncircular. The seal can be omitted, although its use is advantageous, or the O-ring seat can extend around the inside surface of the socket. The number of keys in a joint requiring keys can be varied. The keys can be carried by the male coupling, and the keyways, by the female socket. The feather keys can be made untapered, as can the bottom surfaces of the keyways that will then be parallel to the bottom surfaces of the keys, as in the usual slip-type joint, or one or the other of the surfaces can be tapered. Unfeathered or other types of keys can be employed. These are merely illustrative. It is apparent that different configurations and dimensions can be employed, but it is essential that the walls defining the socket and the male coupling be smooth in the sense that they slide axially freely into and out of engagement, and that they be tapered.

I claim:

1. A hollow stem auger having a slip joint intermediate its length comprising a hollow, female member with a smooth cylindrical outer surface and a socket section at one end of said female member, said socket section having a smooth inner wall surface defining a socket with an open mouth at a free outer end, and a male member with a seat section with a smooth cylindrical outer surface and a coupling part having a smooth outer wall surface defining a shape complementary to the socket of the female member, the wall defining said socket diverging axially outwardly to its mouth, and the wall defining the male part's shape converging toward its free end substantially complementarily to the wall defining the socket, said socket and coupling being conical, an O-ring seat extending around the inner wall of one of the coupling and socket and an O-ring seated therein, one of said socket and coupling carrying axially extending keys, and the other, complementary keyways, the convergence of the coupling wall and the divergence of the socket wall being on the order of 0.5° to 1.5°.

* * * * *